No. 619,644. Patented Feb. 14, 1899.
S. WALTERS.
DEVICE FOR TRIMMING LAWNS.
(Application filed Feb. 23, 1898.)
(No Model.) 2 Sheets—Sheet 1.
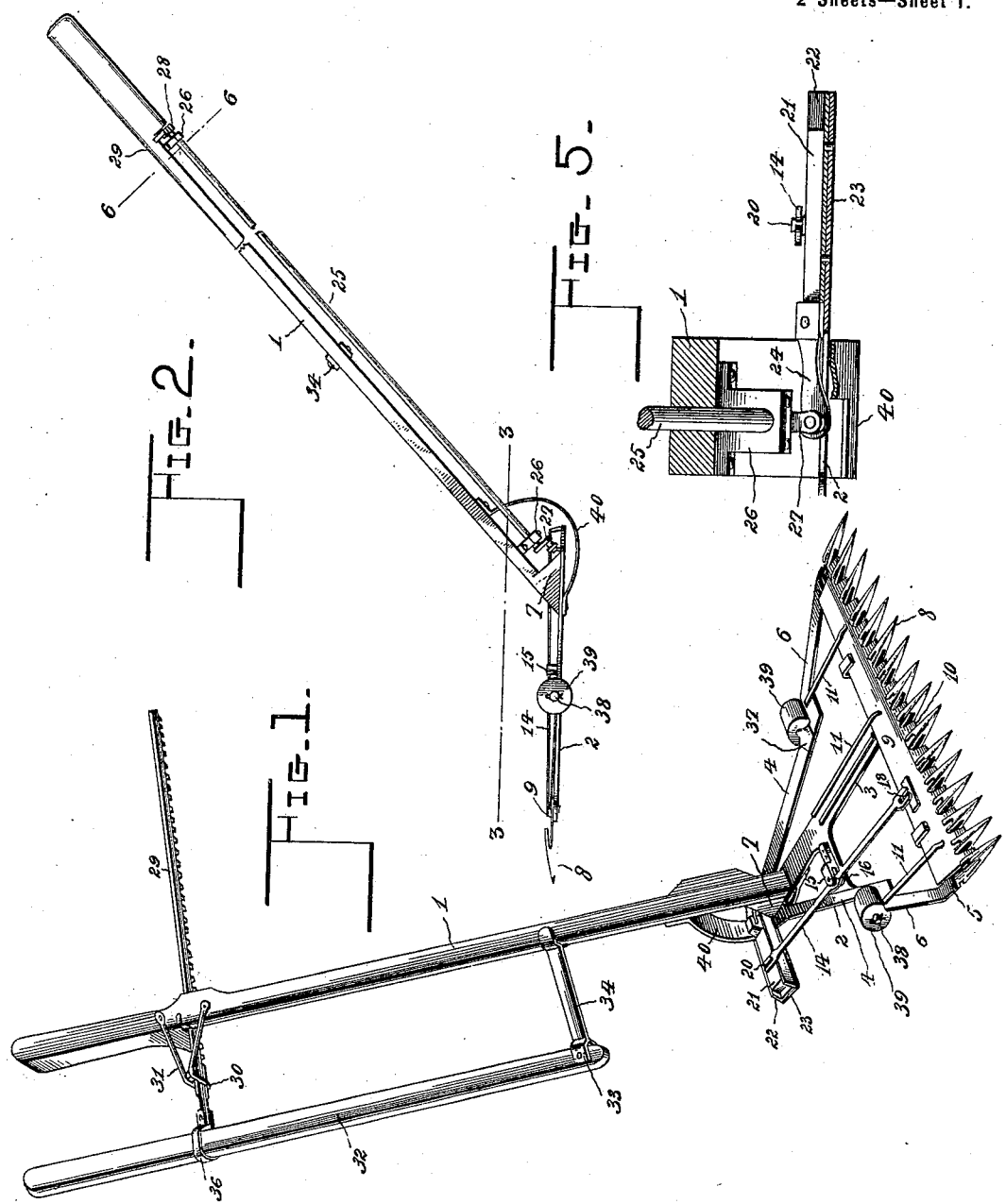
Witnesses
John F. Heufferwiel
H. F. Benkhof
Samuel Walters Inventor
By his Attorneys,
C. A. Snow & Co.
THE NORRIS PETERS CO., PHOTO-LITHO., WASHINGTON, D. C.

No. 619,644. Patented Feb. 14, 1899.
S. WALTERS.
DEVICE FOR TRIMMING LAWNS.
(Application filed Feb. 23, 1898.)
(No Model.) 2 Sheets—Sheet 2.
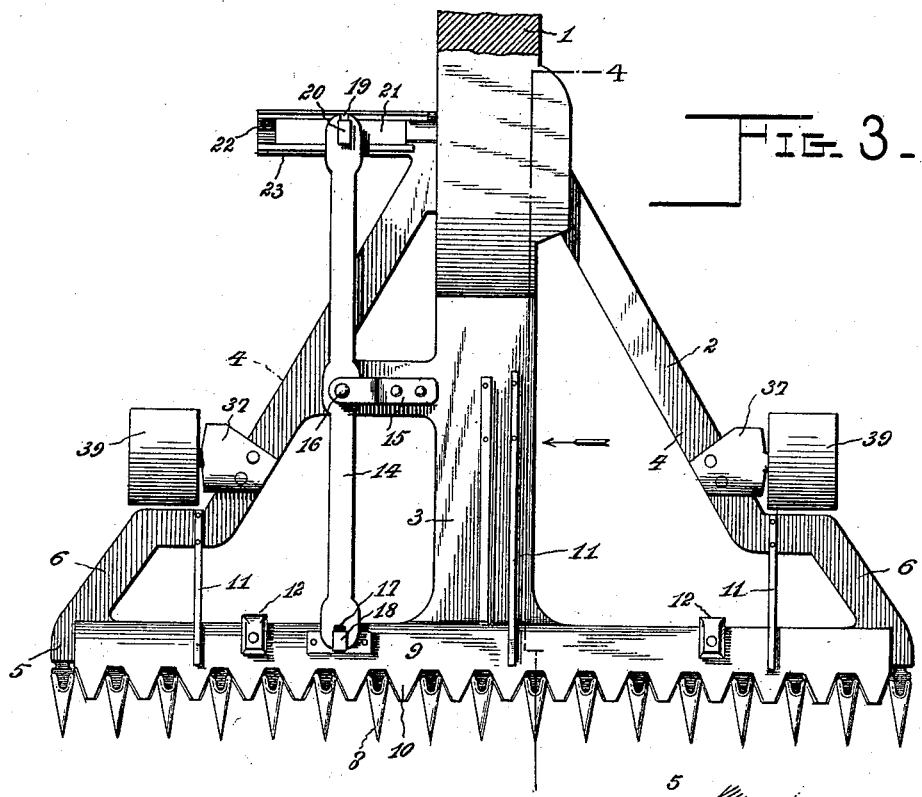
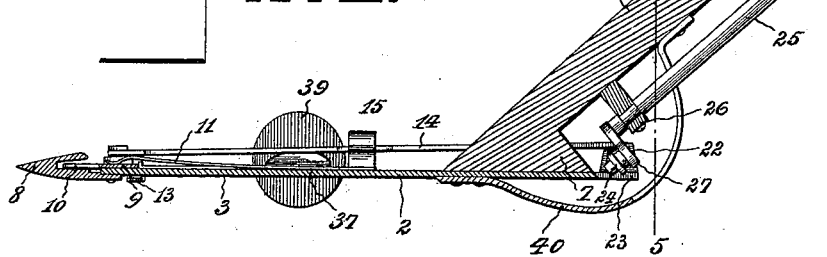
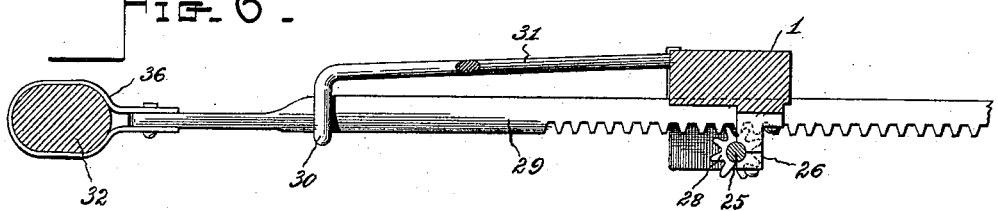
Witnesses
John F. Dauffuniel
H. J. Beulsend
Samuel Walters, Inventor
By his Attorneys,
C. A. Snow & Co.

UNITED STATES PATENT OFFICE.

SAMUEL WALTERS, OF WARREN, PENNSYLVANIA.

DEVICE FOR TRIMMING LAWNS.

SPECIFICATION forming part of Letters Patent No. 619,644, dated February 14, 1899.

Application filed February 23, 1898. Serial No. 671,358. (No model.)

*To all whom it may concern:*

Be it known that I, SAMUEL WALTERS, a citizen of the United States, residing at Warren, in the county of Warren and State of Pennsylvania, have invented a new and useful Device for Trimming Lawns, of which the following is a specification.

My invention relates to devices for trimming lawns; and its primary object is to provide a simple and efficient structure which may be easily and quickly handled for trimming grass around trees, shrubbery, and at the borders of walks and the like in places which are practically inaccessible to ordinary lawn-mowers.

A further object is to simplify the construction and reduce the weight of the trimmer, so that it may be handled by a lady or a child, and, furthermore, to so arrange the parts that the cutter apparatus may be driven positively by hand instead of depending upon the action of traction-wheels, as in ordinary lawn-mowers.

A further object is to hold the reciprocating cutter-bar in contact with the finger-bar under yielding or spring tension, and also to support the structure so that it may be moved with little friction.

With these ends in view the invention consists in the novel combination of elements and in the construction and arrangement of parts, which will be hereinafter fully described and claimed.

To enable others to understand my invention, I have illustrated the preferred embodiment thereof in the accompanying drawings, forming a part of this specification, and in which—

Figure 1 is a perspective view of a lawn-trimming device constructed in accordance with my invention. Fig. 2 is a side elevation thereof. Fig. 3 is a horizontal sectional view on the plane indicated by the dotted line 3 3 of Fig. 2, showing the working parts in plan. Fig. 4 is a longitudinal sectional elevation on the plane indicated by the dotted line 4 4 of Fig. 3, looking in the direction indicated by the arrow. Fig. 5 is a detail sectional view on the plane indicated by the dotted line 5 5 of Fig. 4. Fig. 6 is a transverse section through the staff and operating-lever on the plane indicated by the dotted line 6 6 of Fig. 2.

Like numerals of reference denote like and corresponding parts in each of the several figures of the drawings.

1 designates the staff or bar of my lawn-trimmer, the upper extremity of which is adapted to be grasped by hand for the purpose of moving the device over the lawn and up to the places where it is desired to trim the grass. To carry or support the operating devices of the instrument, I provide a carrying plate or frame 2, which is arranged in a horizontal position at the foot of the staff 1. This carrying plate or frame consists of a central stem 3, the diverging arms 4, and the ledger-plate 5. The ledger-plate is at right angles to the central stem, and the arms 4 join with the extremities of the plate 5 and the rear end of the central stem 3, said arms being furthermore offset or recessed, as at 6, at points intermediate of their length. The carrying plate or frame 2 is made or cast in a single piece of metal, and by its peculiar form said plate or frame is adapted to receive the finger-bar, the cutter-bar, the springs for depressing the cutter-bar into close lateral engagement with the ledger-plate, and certain of the devices for actuating the cutter-bar.

The lower extremity of the staff or bar 1 is formed into an enlarged foot 7, the lower face of which is at an angle to the length of said staff 1, and said foot is applied or fitted to the upper side of the stem 3 of the carrying plate or frame 2, and the parts are rigidly united together in a manner to have the staff assume an inclined position with relation to the horizontal plane of the carrying frame or plate.

The finger-bar in my lawn-trimmer consists of a series of spaced fingers, which are united together and are suitably fastened to the lower side of the ledger-plate 5; but, if desired, these fingers may be cast in separate pieces and fastened individually to the ledger-plate. The finger-bar 8 has its guard-fingers slotted to receive the knives or cutters 10 of the cutter-bar 9, and said cutter-bar is fitted laterally upon the ledger-plate 5 to have firm contact therewith. The cutter-bar is adapted to be driven or reciprocated endwise, so that its knives or cutters will play in the spaces between the fingers, and said cutter-bar is normally pressed downward upon and in close contact with the ledger-plate by a series of springs 11. In the preferred embodiment of my invention the springs are represented as leaf-springs arranged in horizontal positions on the carrying frame or plate 2, the rear ends of said springs being suitably fastened to the carrying-plate 2, while the forward free ends thereof press upon the cutter-bar. The cutter-bar is fitted in the slots in the fingers, and at its rear edge said cutter-bar is provided with the keepers 12, which are attached rigidly to said cutter-bar and are provided with prongs 13, that fit beneath the ledger-plate. These keepers serve to hold the cutter-bar in position on the ledger-plate against displacement thereon, and they permit said cutter-bar to reciprocate freely in an endwise direction.

The cutter-bar is designed to be positively driven by a manually-operated lever having connections with the cutter-bar, and as one element of the connections between said cutter-bar and the operating-lever I have shown a lever 14, arranged in a horizontal position on the plate or frame 2. This lever is fulcrumed at a point intermediate of its length in a fulcrum-block 15 by means of a fulcrum-bolt 16, said fulcrum-block being rigidly fastened to the plate or frame 2. The front end of the lever 14 is slotted, as at 17, to fit beneath a headed stud 18, which is rigidly fastened to the cutter-bar at a suitable point, and the rear end of said lever 14 is also provided with a slot 19, that fits beneath the head of a stud 20, which is attached to a reciprocating cross-head 21. This cross-head 21 is slidably fitted in a guideway 22 on an arm 23, projecting from the heel or rear edge of the plate or frame 2, and said guideway is arranged in a horizontal position parallel to the line of travel of the reciprocating cutter-bar 9. To prevent displacement accidentally of the reciprocating cross-head in its guideway, I make the cross-head and its guideway of dovetailed form in cross-section, and this construction permits the cross-head to slide freely in the guideway under the influence of a crank on a driving-shaft. This driving-shaft is indicated at 25 and is arranged out of the way on the under side of the upwardly-inclined staff 1, and said shaft is journaled at or near its ends in suitable bearings 26, which are rigidly fastened on the under side of said staff. At one end of this shaft 25 it is formed into or provided with a crank 27, and this crank and the cross-head 21 are operatively connected together by a pitman or link 24, the respective ends of which are pivotally connected to the cross-head 21 and the crank 27, as clearly shown by the drawings. To the upper end of the driving-shaft 25 is keyed or otherwise secured a gear-pinion 28, with the teeth of which mesh the teeth of a rack-bar 29, the latter being fitted between the staff 1 and the pinion 28, to be confined or held in proper operative relation to said pinion and to be free to reciprocate with the hand operating-lever 32. The rack-bar 29 plays idly in the eye 30 of a guide 31, which is rigidly fastened to and projects a suitable distance from one side of the staff or bar 1, and to the outer extremity of this rack-bar is loosely or pivotally connected a clip 36, which is fastened to the lever 32 at a point intermediate of the length of the latter. The lower extremity of this lever 32 is fulcrumed, as at 33, to an offstanding arm 34, rigidly fastened to the staff or bar 1 at a suitable distance below the guide 31.

To the carrying plate or frame 2, at a point adjacent to the recesses or offsets 6 in the inclined arms 4, are rigidly secured the brackets 37, and these brackets are formed with the journals 38, which extend in opposite directions from the plate or frame 2. On these journals of the brackets are loosely mounted the carrying rollers or wheels 39.

To the implement is fastened a curved shoe 40. This shoe is bent or formed from a single piece of metal into substantially the curved form shown, and it is arranged to partly inclose the heel of the plate or frame 2 and the foot of the staff 1. The forward end of said shoe extends well beneath the stem 3 of the plate or frame, to which it is rigidly secured in a suitable way, its upper rear end is flanged and secured rigidly to the inclined staff 1, and the lower contact-face of said curved shoe is in the horizontal plane of the lower face of the rollers or wheels 39. The shoe is thus made to serve the purposes of a brace for the frame or plate 2 and the staff 1 and as a means for supporting the lower rear part of the implement which rests upon the rollers or wheels 39 and the shoe 40.

The operation is as follows: The operator grasps the upper part of the staff 1 and moves the implement over the lawn in narrow places which are practically inaccessible to a lawn-mower. The operating-lever 32 is vibrated or worked back and forth by the other hand of the operator, and this vibrating movement of said lever is transmitted by the rack 29 and pinion 28 to the driving-shaft 25, the latter being rotated in one direction or the other, accordingly as the lever 32 is operated. The motion of the driving-shaft is communicated by the crank and pitman to the cross-head 21, which vibrates the lever 14, and the latter in turn reciprocates the cutter-bar.

It will be observed that the lever 14 has its ends loosely connected with the cutter-bar and the cross-head, and thus the lever forms the operating connection between the cross-head and the cutter-bar to allow said parts to reciprocate in planes parallel to each other.

My improved implement is very readily controlled and guided in narrow or restricted places—as, for example, around the trunks of trees, close up to shrubbery, and along the borders of paths or walks—and the cutting apparatus is positively driven by the hand operating-lever, so that the implement does not depend for its action upon the traction or driving wheels in contact with the lawn, whereby the implement may be allowed to remain at rest or in a stationary position while the hand-lever 32 is vibrated to reciprocate the cutter-bar.

It is evident that changes in the form and proportion of parts may be made by a skilled mechanic without departing from the spirit or sacrificing any of the advantages of the invention.

Having thus described the invention, what I claim is—

1. In a device for trimming lawns, a single horizontal frame-plate provided at its front edge with a finger-bar, a single upright staff fastened securely to the frame-plate near the rear edge thereof, carrying-wheels journaled on said frame-plate, at the sides thereof and in rear of the finger-bar, and an arched shoe united firmly to the staff and the frame-plate and arranged in the horizontal plane of the carrying-wheels, combined with a sickle-bar fitted operatively to the finger-bar, a cross-head mounted on the frame-plate and connected with the sickle-bar, a shaft journaled on the staff and having a crank disposed within the space of the arched shoe, a link connecting the crank and the cross-head, and a lever fulcrumed on the staff and connected by intermediate devices with the shaft to operate the latter, substantially as described.

2. In a device for trimming lawns, a horizontal carrying-plate provided at its sides with the rollers and a guideway at the rear edge of said plate, a staff fixed to the carrying-plate, and an arched shoe fixed to the plate and staff, combined with a shaft journaled on the staff and having a crank which plays in the space between said arched shoe and the staff, a cross-head fitted in the guideway, a link connecting the cranked shaft and cross-head, and a cutter apparatus mounted in the carrying-plate and operatively connected with the cross-head, substantially as described.

3. In a device for trimming lawns, an inclined staff, a shaft journaled beneath said staff and provided at one end with a crank and at its other end with a gear-pinion, a fixed guide attached to the staff and having a loop at its free end, an arm fixed to the staff below the guide, a lever fulcrumed on said arm, and a rack-bar pivotally attached to the lever and slidably fitted in the guide-loop to engage with the gear-pinion, in combination with a frame or plate carrying a cutter apparatus, and operative connections between said crank of the shaft and the movable element of the cutter apparatus, substantially as described.

4. In a device for trimming lawns, a horizontal frame-plate, an inclined staff joined firmly thereto, and an arched runner or shoe having its ends joined firmly to the frame-plate and the staff, and having its heel on a plane below the lower face of said frame-plate, in combination with a cutter apparatus on said frame-plate, a shaft journaled on the staff, and connections between said shaft and the movable element of the cutter apparatus, substantially as described.

5. In a device for trimming lawns, the combination of a carrying plate or frame, a staff rigid therewith, a cutter mechanism on said plate or frame, a lever fulcrumed on the staff, a driving-shaft journaled on the staff and provided at one end with a gear-pinion and at its other end with a crank, a rack-bar pivotally connected with said lever and meshing with the pinion of the driving-shaft, a guide fixed to the staff and loosely embracing the rack-bar, a cross-head guided on the carrying-frame and linked to the crank of the driving-shaft, and a lever connection between said cross-head and the cutter mechanism, substantially as described.

In testimony that I claim the foregoing as my own I have hereto affixed my signature in the presence of two witnesses.

SAMUEL WALTERS.

Witnesses:
OTTO MARKER,
H. S. PERRY.